(12) United States Patent
Spink et al.

(10) Patent No.: US 7,146,729 B2
(45) Date of Patent: Dec. 12, 2006

(54) FUEL VAPOR VENT VALVE AND METHOD OF ATTACHING SAME TO A TANK

(75) Inventors: Kenneth M. Spink, Jerome, MI (US); Rudolph Bergsma, deceased, late of Ann Arbor, MI (US); by Rosemary Bergsma, legal representative, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 258 days.

(21) Appl. No.: 10/662,579

(22) Filed: Sep. 15, 2003

(65) Prior Publication Data

US 2005/0055817 A1 Mar. 17, 2005

(51) Int. Cl.
*B21K 1/20* (2006.01)
*F16K 24/00* (2006.01)
*B29C 65/06* (2006.01)

(52) U.S. Cl. ............... 29/890.124; 29/434; 29/469; 29/890.09; 29/890.132; 29/890.126; 137/202; 137/393; 156/73.5

(58) Field of Classification Search ............ 29/434, 29/469, 890.09, 890.124, 890.126, 890.127, 29/890.128, 890.132, DIG. 48; 137/202, 137/587, 393, 401, 410, 426; 156/73.5
See application file for complete search history.

(56) References Cited

U.S. PATENT DOCUMENTS

| | | | | |
|---|---|---|---|---|
| 4,719,681 A | * | 1/1988 | Piet | 29/890.128 |
| 5,062,444 A | * | 11/1991 | Bergsma | 137/202 |
| 5,313,977 A | * | 5/1994 | Bergsma et al. | 137/43 |
| 5,402,818 A | * | 4/1995 | Kasugai et al. | 137/198 |
| 5,404,907 A | | 4/1995 | Benjey | |
| 5,582,198 A | * | 12/1996 | Nagino et al. | 137/43 |
| 5,605,175 A | * | 2/1997 | Bergsma et al. | 137/202 |
| 5,640,989 A | * | 6/1997 | Nemoto et al. | 137/39 |
| 5,755,252 A | * | 5/1998 | Bergsma et al. | 137/202 |
| 5,797,434 A | * | 8/1998 | Benjey et al. | 141/59 |
| 5,906,224 A | * | 5/1999 | Tupper et al. | 137/625.47 |
| 5,996,607 A | * | 12/1999 | Bergsma et al. | 137/202 |
| 6,025,086 A | | 2/2000 | Ching | |
| 6,206,057 B1 | | 3/2001 | Benjey et al. | |
| 6,286,539 B1 | * | 9/2001 | Nishi et al. | 137/202 |
| 6,382,231 B1 | * | 5/2002 | Sugizaki et al. | 137/15.26 |
| 6,408,867 B1 | * | 6/2002 | Aoki et al. | 137/202 |
| 6,422,261 B1 | * | 7/2002 | DeCapua et al. | 137/202 |
| 6,584,996 B1 | * | 7/2003 | Spink | 137/315.11 |
| 6,848,463 B1 | * | 2/2005 | Johansen | 137/202 |
| 6,863,082 B1 | * | 3/2005 | McIntosh et al. | 137/202 |
| 2005/0022383 A1 | * | 2/2005 | Kishi | 29/890.126 |
| 2005/0145316 A1 | * | 7/2005 | Benjey et al. | 156/73.5 |
| 2006/0108000 A1 | * | 5/2006 | Kaneko et al. | 137/202 |

FOREIGN PATENT DOCUMENTS

EP 1515072 A1 * 3/2005
JP 2005090504 A * 4/2005

* cited by examiner

*Primary Examiner*—Essama Omgba
(74) *Attorney, Agent, or Firm*—Anna M. Shih; Roger A. Johnston

(57) ABSTRACT

A float operated fuel vapor vent valve has body structure with an annular mounting flange formed of material weldable to a fuel tank and the flange is spin welded to the tank. The float has surfaces thereon which slidably engage corresponding surfaces in the float chamber to prevent relative rotation of the float with respect to the valve body during spin welding. An optional pressure relief valve in the vent outlet also has surfaces slidably engaging the vent passage to prevent relative rotation during spin welding.

14 Claims, 3 Drawing Sheets

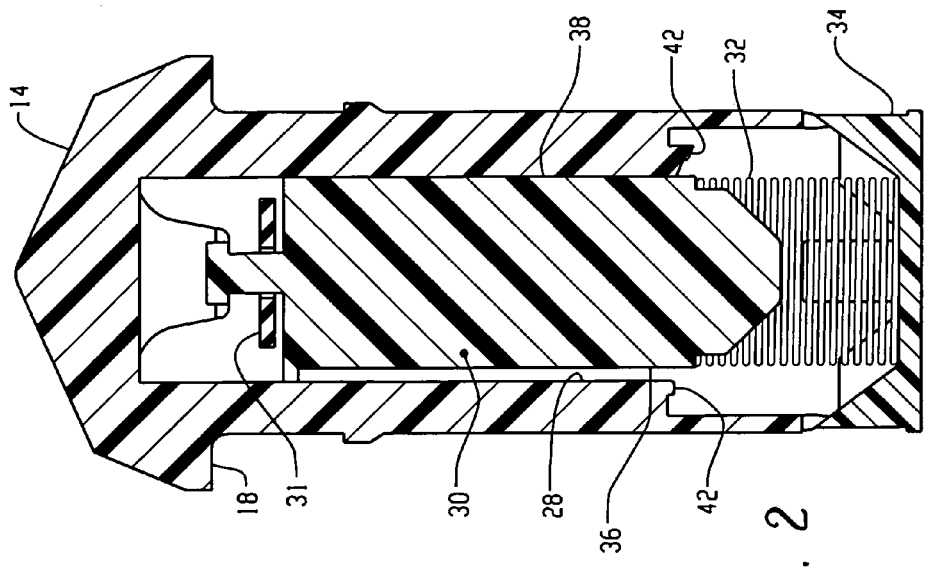
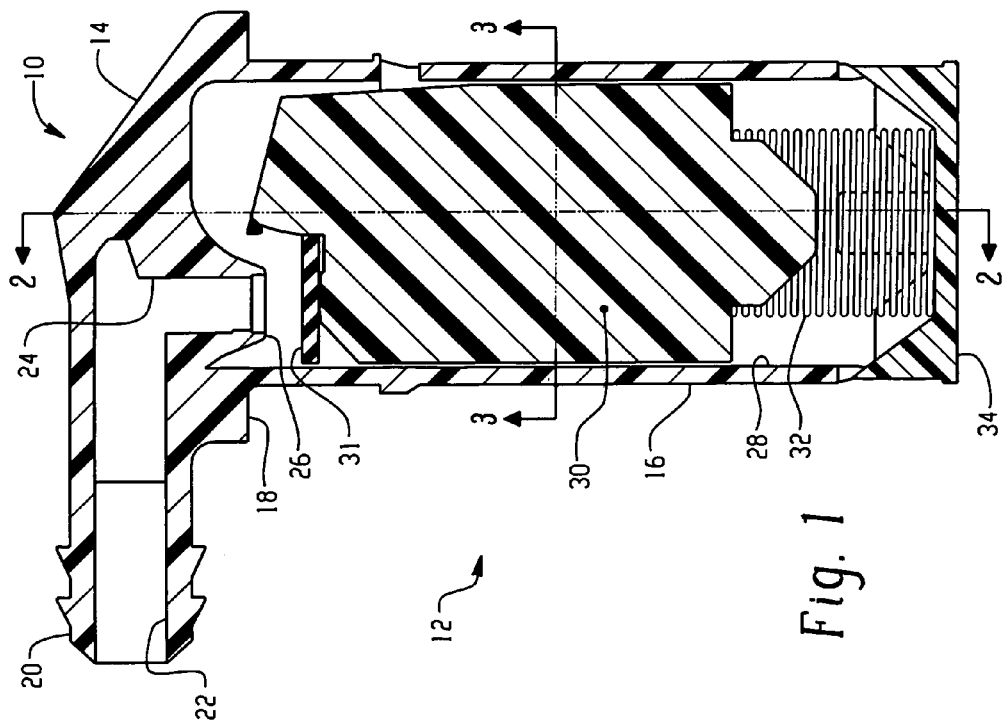

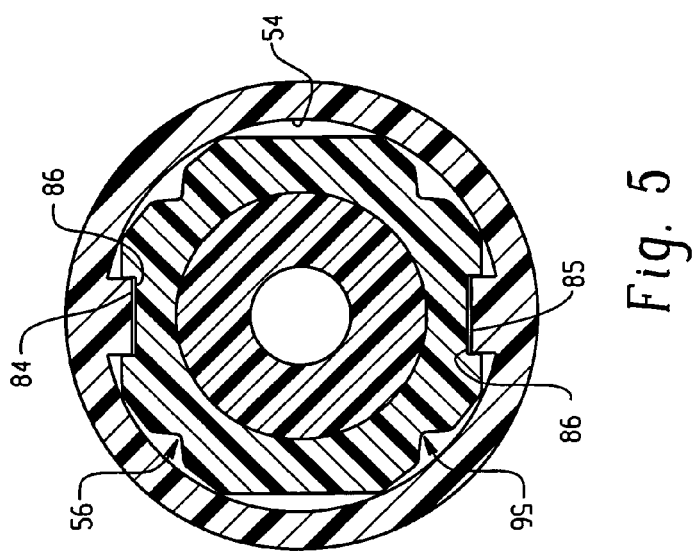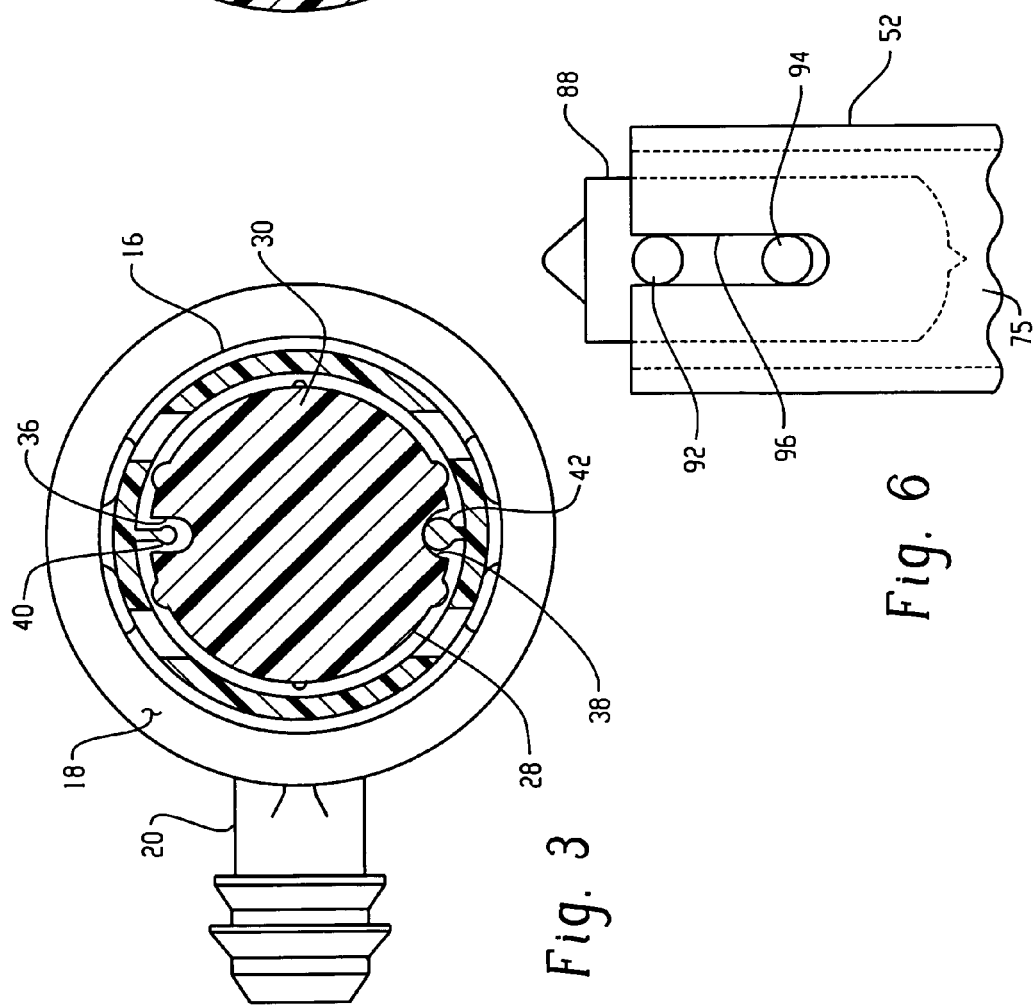

FUEL VAPOR VENT VALVE AND METHOD OF ATTACHING SAME TO A TANK

BACKGROUND OF THE INVENTION

The present invention relates to fuel vapor vent valves employed in vapor emission controls systems in motor vehicle fuel tank installations. The invention particularly relates to float operated vent valves attached to the upper wall of a non-metallic fuel tank. Valves employed for such applications are commonly mounted onto the tank through an access opening formed in the upper wall with portions of the valve extending outwardly over the opening and attached to the outer surface of the tank in a sealing arrangement, as for example, by weldment of compatible non-metallic material to the surface of the tank.

Heretofore the weldment has been by hot-plate or sonic welding techniques which have proven relatively costly in mass production. Heretofore, attempts to spin weld a fuel vapor vent valve of the present type have resulted in destruction of the valving surfaces by the extreme rotational accelerations and decelerations. Furthermore, proper or accurate orientation of the vent hose connector was not possible with spin welding. However, spin welding has been desired as a more cost effective way of attaching the vent valve to the tank than hot-late or sonic welding.

BRIEF SUMMARY OF THE INVENTION

The present invention provides a float operated vapor vent valve for a fuel tank which may be assembled through an access opening formed in the upper wall of the tank with the float operated valve extending interiorly of the tank and a vent port connection extending exteriorly of the tank. The valve has a flange formed of material compatible for welding to the outer surface of the tank to effect a permanent sealing attachment thereon. The float is slidably movable in the float chamber and has surfaces thereon engaging the wall of the float chamber to prevent relative rotation of the float valve member with respect to the valve body. The slidable rotary float constraint enables spin welding of the flange to the tank without loss of calibration or damage to the valve components. An optional gravity operated pressure relief valve may be incorporated in the vent passage; and, the relief valve also has surfaces thereon slidably engaging the wall of the vent passage to prevent relative rotation of the relief valve poppet during spin welding.

BRIEF DESCRIPTION OF THE DRAWINGS

FIG. 1 is a cross section of a valve employing the present invention;

FIG. 2 is a sectional view taken along section indicating line 2—2 of FIG. 1;

FIG. 3 is a section view taken along section indicating line 3—3 of FIG. 1;

FIG. 5 is a section view taken along section indicating line 5—5 of FIG. 4; and FIG. 6 is a section view taken along section indicating line 6—6 of FIG. 4.

DETAILED DESCRIPTION OF THE INVENTION

Figure 4:
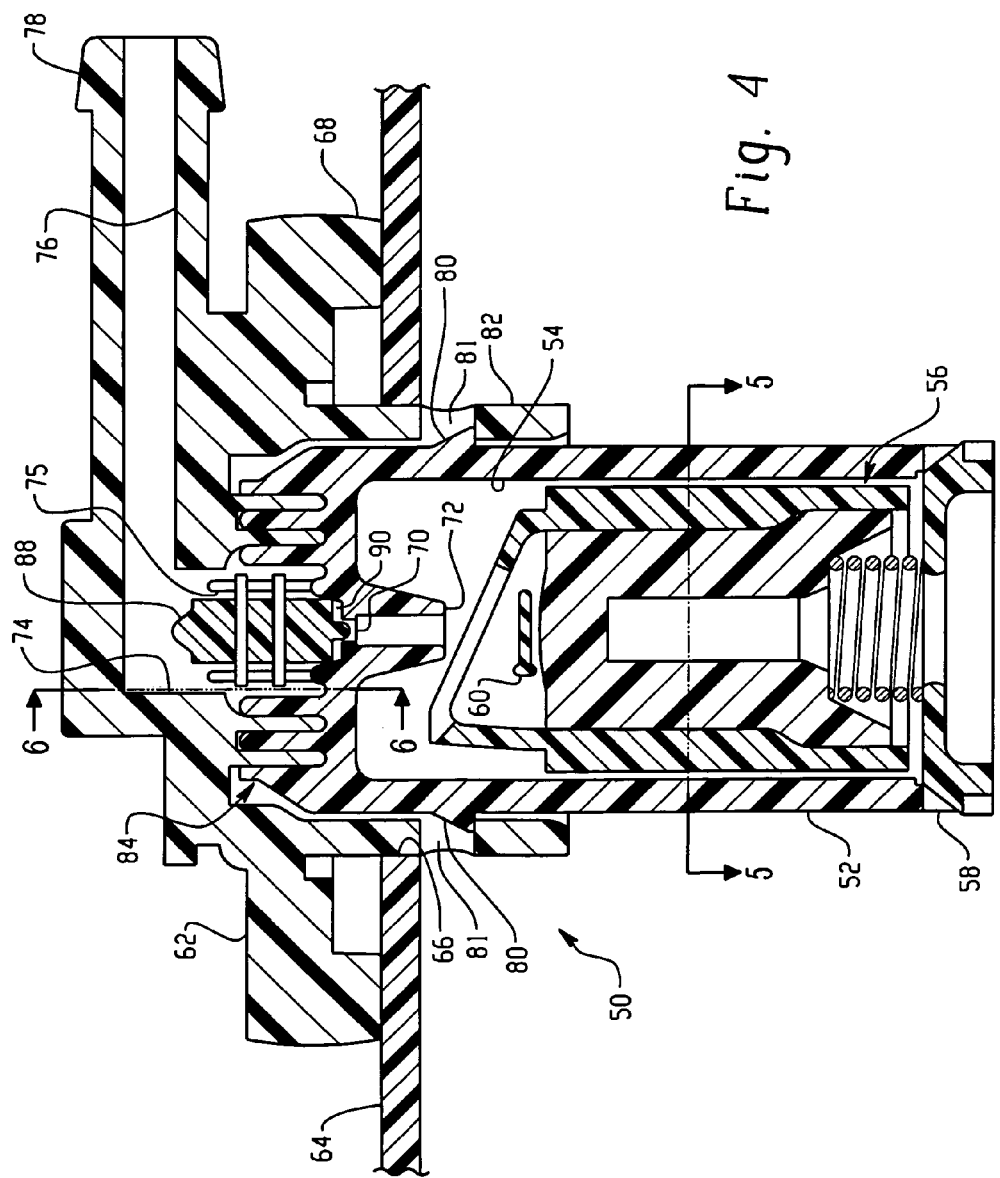
FIG. 4 is a cross section of an alternate embodiment of the invention shown mounted through an access opening in a fuel tank.

Referring to FIG. 1, a valve assembly indicated generally at 10 has a unitary or one piece body indicated generally at 12, formed with an upper or exterior portion 14 with an annular mounting flange 18 and a lower portion 16 intended for extending interiorly of the tank. The upper portion has a fitting 20 provided thereon with a vent passage 22 formed therein; and, fitting 20 is adapted for having a flexible hose received thereon for connection thereto. Passage 22 communicates with a downwardly extending passage 24 which has a valve seat 26 formed at the lower end thereof.

The lower portion 16 of the body has a float chamber 28 formed therein into which is received a float member 30 with a resiliently flexible valve member in the form of a pivoted flapper pad or disk 31 disposed on the upper end of the float 30 for movement therewith.

The float 30 is biased upwardly by a spring 32 with one end registered against the lower end of the float 30 and the opposite end of the spring 32 registered against an end cap or closure member 34 secured in the lower end of the float chamber 28. The spring is calibrated to provide the desired buoyancy force in the fuel to be used in a known manner. It will be understood that when the fuel level in the tank rises to a certain level, upward movement of float 30 causes valve member 31 to close against valve seat 26.

Referring to FIGS. 2 and 3, the float 30 has at least one and preferably a plurality of oppositely disposed engagement surfaces in the form of longitudinal groves 36, 38 formed therein; and, the wall of the float chamber 28 has correspondingly configured engagement surfaces in the form of projections 40, 42 provided thereon which slidably engage the groves 36, 38 respectively. Upon spin welding of the body flange 18 onto the fuel tank the sliding engagement of the projections 40, 42 with the grooves 36, 38 prevents relative rotation of the float with respect to the body and thus prevents damage to the float and valve member and any deleterious effects on the calibration of the float spring 32.

Referring to FIGS. 4, 5 and 6, another embodiment of the invention indicated generally at 50 is illustrated and includes a body 52 having a float chamber 54 formed therein with a float assembly indicated generally at 56 slidably received therein and retained by a cap or closure 58 attached to the lower end of the body. The float assembly 56 includes a resilient valve member 60 disposed and captured on the upper end of the float 56.

The upper end of the body is attached to a cover member 62 which is disposed exteriorly of the wall of a fuel tank 64 with portions thereof extending through an access opening 66 formed in the tank wall 64. The cover 62 has an annular flange 68 extending outwardly of the access opening 66 and which is retained and sealed on the outer surface of the tank wall 64 by spin welding.

The upper end of the body defines a vent passage 70 having a valve seat 72 associated therewith which is disposed vertically in line with the valve member 60, and, valve seat 72 is closed by valve member 60 upon upward movement of the float when the fuel level rises to a level causing the float to close the valve. Vent passage 70 communicates with an upward passage 74 which communicates with a vent outlet 76 formed in a fitting 78 adapted for receiving an end of a hose thereover.

The body 52 is attached to the cover 62 by snap locking of barbs 80 into apertures or recesses 81 formed in the cylindrical portion 82 of the cover which extends downwardly through the access opening 66.

The upper end of the body 52 is attached and secured to the cover by a labyrinth seal indicated generally at 84; and, the assembly of the body 52 and the cover 62 is attached to the upper surface of the tank 64 by spin welding.

Referring to FIG. 5, the float assembly 56 has at least one and preferably a plurality of engagement surfaces in the form of longitudinally extending grooves 85 formed therein which are slidably engaged with a correspondingly disposed pair of engagement surfaces or guides 86 formed on the inner periphery of float chamber 54.

Referring to FIGS. 4 and 6, a gravity operated pressure relief valve member 88 is slidably disposed in the passage 75 formed as a counter bore on the upper end of vent passage 70, with a valving surface 90 formed on the lower end thereof for seating against the upper end of the vent passage 70. The valve member 88 has a plurality of projections or engagement surfaces 92, 94, preferably formed by cross pins, which are slidably received in the slot 96 formed in the upper end of the body 52. The engagement of pins 92, 94 with the slot 96 prevents rotation of the valve member 88 during spin welding.

The present invention thus provides for spin welding attachment of a fuel vapor vent valve to the exterior surface of a fuel tank which eliminates the need for a heating device for welding. The invention permits spin welding without disturbing the interior components and calibration of the vapor vent valve during spinning. The valve of the present invention includes surfaces on the float and on an optional gravity pressure relief valve which slidably engage corresponding surfaces on the valve body to prevent relative rotation of the respective parts during the spin welding operation.

Although the invention has hereinabove been described with respect to the illustrated embodiments, it will be understood that the invention is capable of modification and variation and is limited only by the following claims.

What is claimed is:

1. A method of making a float operated vapor vent valve that is mountable through an access opening to a fuel tank comprising:
   (a) forming a valve body with an annular flange that extends outwardly over said access opening and that is attachable to the fuel tank, the valve body including a float chamber, and disposing a float therein and forming a vent port with a float valve communicating with the float chamber;
   (b) disposing a valve member for movement with the float and moving the float and seating the valve member on said valve seat and closing the vent port;
   (c) forming co-operating surfaces on said float chamber and said float and engaging said surfaces to prevent relative rotation therebetween;
   (d) forming at least one slot on one of said valve body and said valve member and at least one projection on the other of said valve body and said valve member; and
   (e) disposing said at least one projection in said at least one slot.

2. The method defined in claim 1 wherein said step of forming cooperating surfaces on said float chamber and said float includes forming a plurality of ribs on one of said float chamber and said float and forming corresponding grooves on the other of said float chamber and said float.

3. The method defined in claim 1, wherein said step of forming the valve body includes forming a body portion of non-weldable material and attaching a cover of weldable material with the flange portion thereon.

4. A method of making a float operated vapor vent valve that is mountable through an access opening to a fuel tank comprising:
   (a) forming a valve body with an flange that is attachable to the fuel tank, the valve body including a float chamber, and disposing a float therein and forming a vent port with a float valve communicating with the float chamber;
   (b) disposing a valve member for movement with the float and moving the float and seating the valve member on said valve seat and closing the vent port;
   (c) forming co-operating surfaces on said float chamber and said float and engaging said surfaces to prevent relative rotation therebetween;
   (d) disposing a pressure relief valve in said vent port downstream of said valve seat by disposing an obturator and preventing rotation thereof with respect to said valve body.

5. The method defined in claim 4 wherein said step of preventing rotation includes forming a plurality of slots on one of said obturator and said valve body and engaging the slots with cooperating surfaces on the other of said obturator and said valve body.

6. The method defined in claim 5 wherein said step of engaging the slots includes disposing a cross pin in said pressure relief valve.

7. A float operated vapor vent valve for mounting through an access opening in a fuel tank and attachment to the tank:
   (a) a valve body formed of material with a flange portion attachable to the tank and having a float chamber therein with a vent passage having a valve seat;
   (b) a float disposed in the float chamber and having a valve member thereon moveable with the float for closing against said valve seat;
   (c) said flange portion extends outwardly over the access opening and is attached to the tank;
   (d) said float includes surfaces thereon that engage cooperating surfaces in said float chamber for preventing relative rotation therebetween; and
   (e) a pressure relief valve disposed in said vent passage downstream of said valve seat, said pressure relief valve including a second valve seat and an obturator moveable with respect thereto and anti-rotation means operable to prevent relative rotation between said obturator and said second valve seat during welding.

8. The float operated vapor vent valve defined in claim 7, wherein said cooperating surfaces include ribs on one of said float and said float chamber and grooves on the other of said float and said float chamber.

9. The float operated vapor vent valve defined in claim 7, wherein said pressure relief valve includes a second valve seat and an obturator moveable with respect thereto.

10. The float operated vapor vent valve defined in claim 7, wherein said anti-rotation means includes a slot in one of said valve body and said obturator engaged with a projection on the other of said valve body and said obturator.

11. The float operated vapor vent valve defined in claim 10, wherein projection includes a cross pin in said obturator.

12. The float operated vapor vent valve defined in claim 7, further comprising an annular labyrinth seal on said valve body.

13. The float operated vapor vent valve defined in claim 7, wherein said body is formed of non-weldable material and has a cover of weldable material with said flange attached thereto.

14. The float operated vapor vent valve of claim 7, wherein the flange is made of a weldable material.

\* \* \* \* \*